United States Patent
Khabashesku et al.

(10) Patent No.: US 11,897,767 B2
(45) Date of Patent: Feb. 13, 2024

(54) DIRECT GAS FLUORINATION OF BORON NITRIDES AND COMPOSITIONS INCLUDING FLUORINATED BORON NITRIDES

(71) Applicants: William Marsh Rice University, Houston, TX (US); Baker Hughes Oilfield Operations LLC, Houston, TX (US)

(72) Inventors: Valery N. Khabashesku, Houston, TX (US); Ashok Kumar Meiyazhagan, Houston, TX (US); Pulickel M. Ajayan, Houston, TX (US)

(73) Assignees: William Marsh Rice University, Houston, TX (US); Baker Hughes Oilfield Operations LLC, Houston, TX (US)

( * ) Notice: Subject to any disclaimer, the term of this patent is extended or adjusted under 35 U.S.C. 154(b) by 1090 days.

(21) Appl. No.: 16/721,552

(22) Filed: Dec. 19, 2019

(65) Prior Publication Data
US 2021/0188637 A1 Jun. 24, 2021

(51) Int. Cl.
*C01B 21/064* (2006.01)

(52) U.S. Cl.
CPC ...... *C01B 21/0648* (2013.01); *C01P 2004/22* (2013.01); *C01P 2004/61* (2013.01)

(58) Field of Classification Search
None
See application file for complete search history.

(56) References Cited

U.S. PATENT DOCUMENTS
2018/0170755 A1 6/2018 Hermans et al.

FOREIGN PATENT DOCUMENTS
CN 108531131 A 9/2018

OTHER PUBLICATIONS

Schumb et al.; The fluorination of nitrides, Inorganic Chemistry 3.6, 922-923; 1964.*
Zhao et al.; Angew. Chem. Int. Ed. 53, 3645-3649; 2014.*
International Search Report for International Application No. PCT/US20/066065, dated Apr. 15, 2021, 4 pages.
International Written Opinion for International Application No. PCT/US20/66065, dated Apr. 15, 2021, 4 pages.
(Continued)

*Primary Examiner* — Guinever S Gregorio
(74) *Attorney, Agent, or Firm* — TraskBritt

(57) ABSTRACT

A method for producing fluorinated boron nitride involves heating a reactor chamber, providing boron nitride in the reactor chamber, flowing fluorine and an inert gas through the reactor chamber, and exposing the boron nitride to the flowing gases and the heat. The method may include boron nitride that is exfoliated or non-exfoliated. The fluorinated boron nitride that is produced from this method may have a hexagonal crystal structure or a cubic crystal structure. The method may additionally comprise removing the fluorinated boron nitride from the reactor chamber and mixing it with a surfactant. A suspension may comprise particles of fluorinated boron nitride suspended in a fluid, which may be polar or non-polar, and may additionally include a surfactant. The fluorinated boron nitride may have a hexagonal or a cubic crystal structure. Furthermore, the boron nitride may be exfoliated or non-exfoliated.

11 Claims, 6 Drawing Sheets

(56) References Cited

OTHER PUBLICATIONS

Radhakrishnan, Sruthi et al., "Supplementary Materials for Fluorinated h-BN as a magnetic semiconductor". Science Advances. 2017. vol. 3. No. 7.
Zhang, Zhuhua et al., "Fluorinating hexagonal boron nitride into dimnond-like nanofilms with tunable band gap and ferromagnetism". Journal of the American Chemical Society. 2011. vol. 133. No. 37. pp. 14831-14838.
Zhou, Zhen et al., "Atomic and electronic stmctures of fluorinated BN nanotubes: computational study". The Journal of Physical Chemistry B. 2006. vol. 110. No. 51. pp. 25678-25685.
Du et al., One-Step Exfoliation and Fluorination of Boron Nitride Nanosheets and a Study of Their Magnetic Properties, Angew. Chem., vol. 126, (2014), pp. 3719-3723.
Radhakrishnan et al., Fluorinated h-BN as a Magnetic Semiconductor, Sci. Adv., vol. 3, (2017), 8 pages.
Tang et al., Fluorination and Electrical Conductivity of BN Nanotubes, J. Am. Chem. Soc., vol. 127, (2005), pp. 6552-6553.
Xue et al., Excellent Electrical Conductivity of the Exfoliated and Fluorinated Hexagonal Boron Nitride, Nanoscale Research Letters, vol. 8, No. 49, (2013), 7 pages.
Yu et al., Efficient Dispersant-Free Liquid Exfoliation Down to the Graphene-Like State of Solvent-Free Mechanochemically Delaminated Bulk Hexagonal Boron Nitride, RSC Adv., vol. 6, (2016), pp. 47112-47119.

\* cited by examiner

DIRECT GAS FLUORINATION OF BORON NITRIDES AND COMPOSITIONS INCLUDING FLUORINATED BORON NITRIDES

TECHNICAL FIELD

The present disclosure relates to the fabrication of fluorinated hexagonal boron nitride and fluorinated cubic boron nitride obtained through a direct gas fluorination technique, compositions including fluorinated boron nitride, and to methods of using such compositions.

BACKGROUND

Boron nitride can exist in several crystalline forms. It typically exists in its most stable form, which comprises a hexagonal crystal structure that is similar to the structure of graphite. Boron nitride can also exist in both cubic and wurtzite crystal structures.

Hexagonal boron nitride is a well-known example of a 2D material that has recently gained significant interest due to its potential applications in various fields of science and technology. Boron nitride is isostructural and isoelectronic to carbon, and comprises a balanced composition of nitrogen and boron atoms.

The chemical functionalization of boron nitride has been a subject of interest due to its potential to alter the physical, chemical, electronic, and atomic structures of the material, thus leading to novel properties. Previous studies have investigated the functionalization or doping of hexagonal boron nitride using heteroatom substitution and stannic oxide coating, as well as the intercalation of various functional hydroxy, amino, alkyl, and halogen groups.

Boron nitrides display poor chemical reactivity, which makes them ineffective when used with common solvents. However, functionalization of the boron nitrides may assist in their homogeneous dispersion or suspension in many solvents.

Various theoretical studies have suggested the possibility of functionalizing boron nitrides with fluorine atoms. Being the lightest halogen, fluorine is highly reactive and highly electronegative. The functionalization of boron nitrides with the electronegative fluorine atoms helps to activate the bonding efficiency of the resulting fluorinated boron nitrides with other electropositive chemical species.

Fluorinated boron nitrides have the potential to be used in a variety of applications. The introduction of electronegative fluorine atoms into boron nitrides modifies their band gap and electronic structures, thereby converting them into semiconductors and inducing magnetism. The fluorinated boron nitrides can thus be used for electronics and magnetic memory, as well as in thermal applications due to their excellent thermal conductivity.

Recent research has proposed the fluorination of boron nanotubes using a mixture of boron trifluoride and ammonia gas, which are catalyzed with the help of magnesium chloride. See e.g., C. Tang et al., *Fluorination and Electrical Conductivity of BN Nanotubes*, Journal of the American Chemical Society, vol. 127, no. 18, pp. 6552-6553, 2005. Other research has discussed the possibility of solvo-thermal fluorination of hexagonal boron nitride and tungsten disulfide using Nafion as the fluorine source. See e.g., S. Radhakrishnan et al., *Fluorinated h-BN as a magnetic semiconductor*, Science Advances, vol. 3, no. 7, p. e1700842, 2017.

BRIEF SUMMARY

In some embodiments, the present disclosure includes a method for producing fluorinated boron nitride, which involves heating an interior of a reactor chamber to at least 20° C., placing boron nitride in the reactor chamber, flowing fluorine gas and an inert gas through the reactor chamber, and exposing the boron nitride to the flowing gases and the heat. The inert gas may be helium or nitrogen in some embodiments.

The boron nitride may be exposed to the flowing gas and the heat for at least one hour and the boron nitride may be a powder including particles having an average particle size in a range extending from 70 nanometers to 45 micrometers. In some embodiments, the boron nitride may be in the form of two-dimensional atomic layers, which may be exfoliated before or after placing it in the reactor chamber. Furthermore, the fluorinated boron nitride may have a hexagonal crystal structure or a cubic crystal structure. In some embodiments, the method may additionally comprise removing the fluorinated boron nitride from the reactor chamber and mixing it with a surfactant.

Additional embodiments of the present disclosure comprise useful products including fluorinated boron nitride fabricated as described herein. For example, a suspension may include particles of fluorinated boron nitride suspended in a fluid. The fluorinated boron nitride may have a hexagonal or a cubic crystal structure. In embodiments in which the fluorinated boron nitride has a hexagonal crystal structure, the boron nitride may be exfoliated or non-exfoliated. The fluid may be polar or non-polar. In embodiments in which the fluid is non-polar, the fluid may comprise oil, for example. The suspension may additionally comprise a surfactant and other optional additives.

BRIEF DESCRIPTION OF THE DRAWINGS

While the specification concludes with claims particularly pointing out and distinctly claiming what are regarded as embodiments of the present disclosure, various features and advantages of this disclosure may be more readily ascertained from the following description of example embodiments provided with reference to the accompanying drawings, in which:

DETAILED DESCRIPTION

The illustrations presented herein are not actual views of any particular material, device, system, or method, but are merely idealized representations that are employed to describe embodiments of the present disclosure.

In accordance with some embodiments of the present disclosure, fluorinated boron nitride having a hexagonal or a cubic crystal structure may be formed by a direct gas fluorination process.

Figure 1:
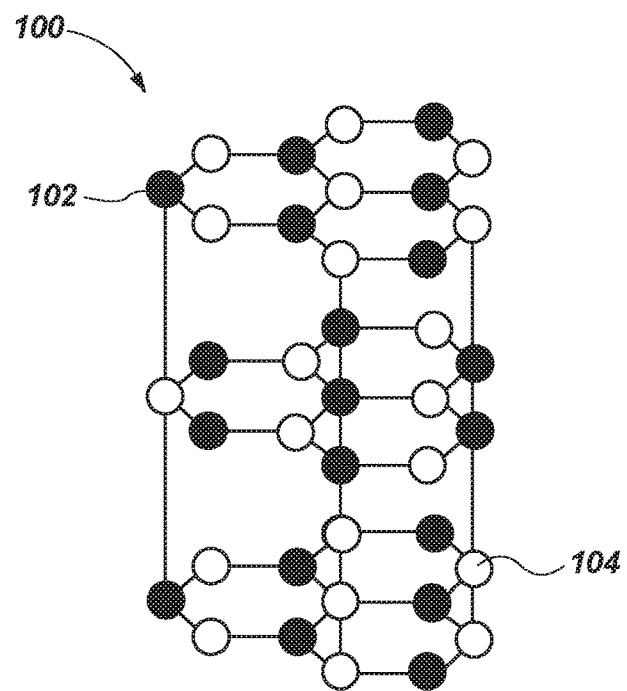
FIG. 1 illustrates a hexagonal boron nitride crystal structure.

FIG. 1 schematically illustrates the crystal structure of hexagonal boron nitride 100 (h-BN), which is the most stable form of boron nitride, and is also referred to as α-BN, g-BN, and graphitic boron nitride in the art. Hexagonal boron nitride 100 has a layered structure similar to graphite that includes multiple 2D layers of covalently bonded hexagonal rings of boron 102 and nitrogen 104 atoms. Within each 2D layer, boron 102 and nitrogen 104 atoms are bound by strong covalent bonds, whereas the 2D layers are held together by weak van der Waals forces.

The boron nitride of FIG. 1 may be a commercial boron nitride powder of mean particle sizes ranging from about 45 um to about 70 nm.

Figure 2:
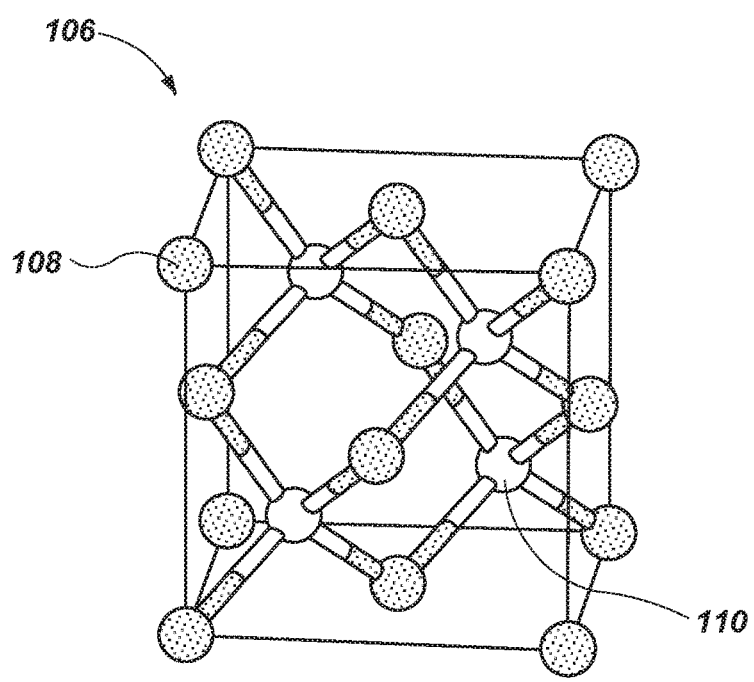
FIG. 2 illustrates a cubic boron nitride crystal structure.

FIG. 2 schematically illustrates the crystal structure of cubic boron nitride 106 (c-BN), and illustrates the atomic positions and inter-atomic bonding of the boron 108 and nitrogen 110 atoms therein. Cubic boron nitride 106 has the sphalerite crystal structure, and is also referred to as β-BN in the art.

Figure 3:
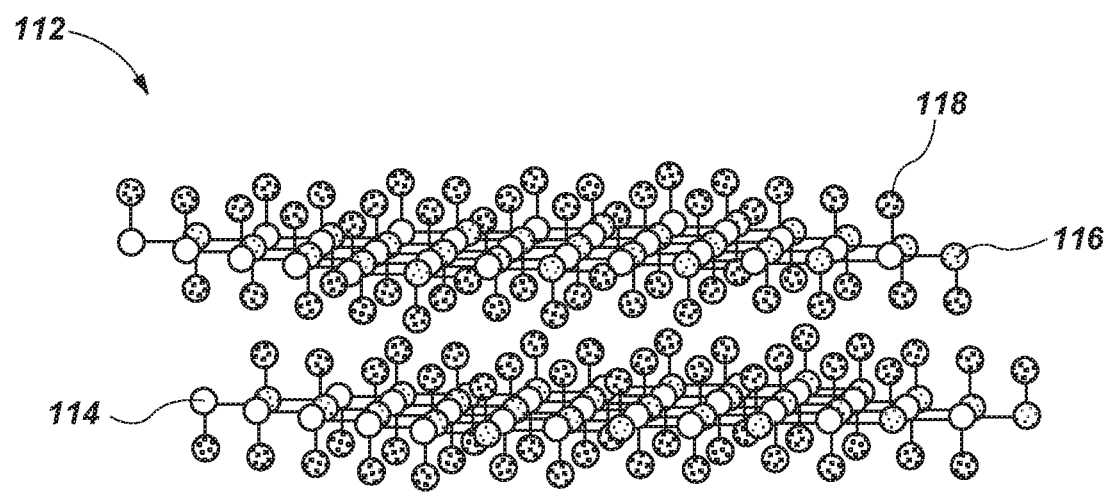
FIG. 3 illustrates fluorinated hexagonal boron nitride.

In accordance with embodiments of the present disclosure, fluorinated boron nitride (F-BN) may be fabricated using a direct gas fluorination process, as described in further detail below. FIG. 3 schematically illustrates fluorinated hexagonal boron nitride 112, which includes covalently bonded nitrogen 114, boron 116, and fluorine 118 atoms. The fluorine 118 atoms may be bonded to both nitrogen 114 and boron 116 atoms. Furthermore, the fluorinated hexagonal boron nitride 112 formed in accordance with embodiments of methods of the present disclosure may exist in exfoliated form comprising separated, individual 2D layers of fluorinated boron nitride, or in non-exfoliated form comprising inter-bonded (by van der Waals forces) 2D layers of boron nitride. In such a non-exfoliated form, the fluorine 118 atoms may be present primarily at the surface of the boron nitride. Fluorinated c-BN and boron nitride in any another form, such as the wurtzite crystal structure, may also be formed in accordance with embodiments of methods of the present disclosure, as discussed in further detail below.

Figure 4:
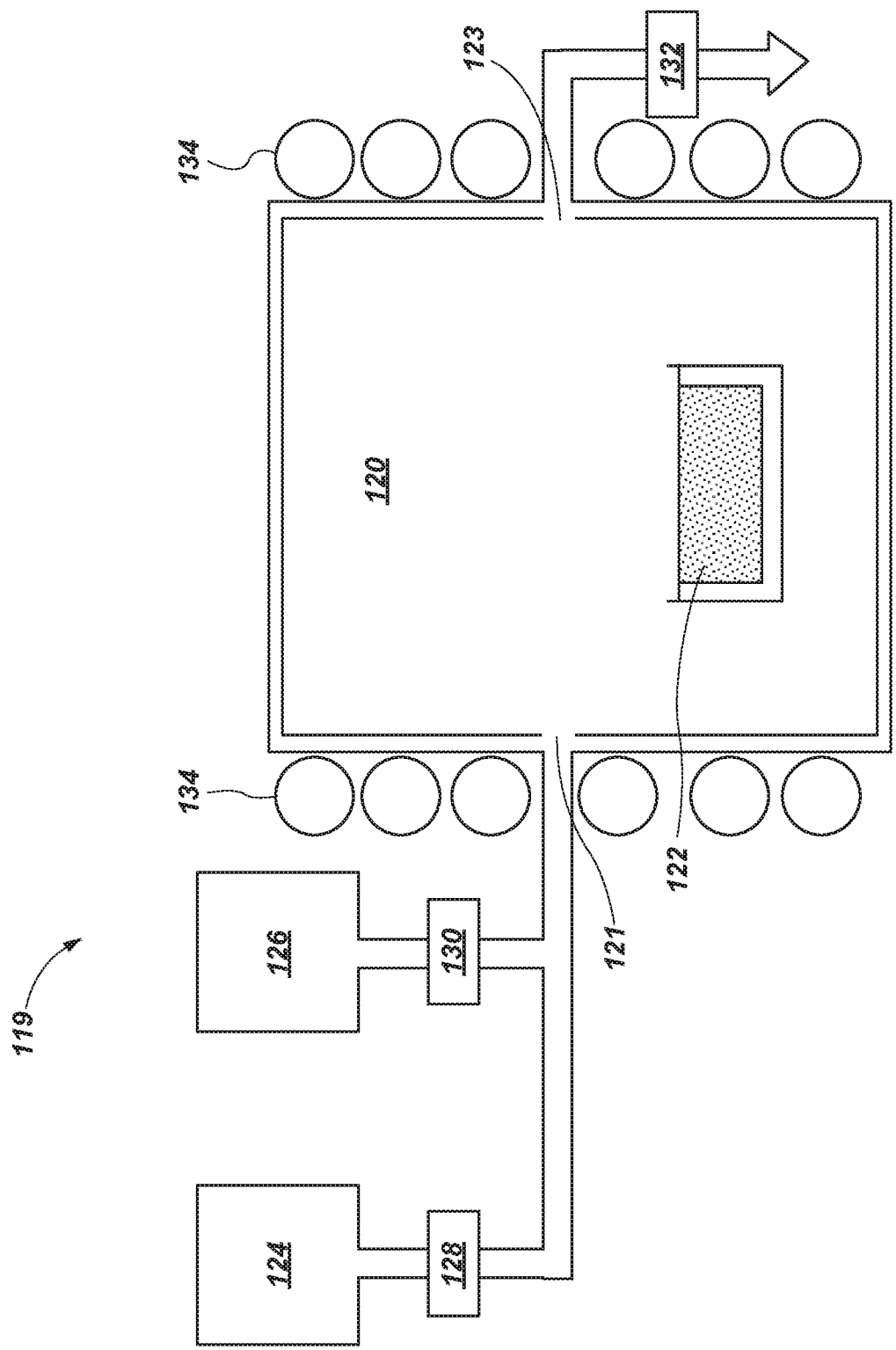
FIG. 4 is used to illustrate an embodiment of a method of the present disclosure, and illustrates the fabrication of fluorinated hexagonal boron nitride as shown in FIG. 3.

FIG. 4 is a schematic illustration of a system 119 that may be used to form fluorinated boron nitride in accordance with embodiments of the present disclosure. The system 119 includes a reactor chamber 120 in which boron nitride 122 to be fluorinated may be provided. The system 119 further includes a source 124 of fluorine gas and a source 126 of an inert gas, such as helium gas, nitrogen gas, or a mixture thereof. A first flow control device 128 may be used to control the flow of fluorine gas into the reactor chamber 120, and a second flow control device 130 may be used to control the flow of the inert gas into the reactor chamber 120 through an inlet 121. The gases may flow from the inlet 121, through the interior of the reactor chamber 120, and out from the reactor chamber 120 through an outlet 123.

The fluorine may comprise from about 1% to about 50%, and more particularly from about 5% to about 15% (e.g., 10%) of the gas flowing through the reactor chamber 120, with the remainder of the gas comprising the one or more inert gases, in accordance with embodiments of the present disclosure.

The system 119 may further include a pressure control device 132 for controlling a pressure within the reactor chamber 120 during the direct gas fluorination process. The pressure control device 132 may comprise, for example, a vacuum pump.

The system 119 may also include at least one heating device 134 for controlling a temperature within the reactor chamber 120 during the gas fluorination process. The heating devices 134 may comprise, for example, a resistive heating coil, although any other heating device, such as a hot plate, suitable for controlling the temperature of the matter within the reactor chamber 120 may be employed.

The flow rate of the gases through the reactor may be between about 2% and about 50% of the internal volume of the reactor chamber 120 per minute, and more particularly between about 2% and about 20% of the internal volume of the reactor chamber 120 per minute. As a non-limiting example, in a non-limiting laboratory scale embodiment, the reactor chamber 120 may be cylindrical, and may have a volume of approximately 300 cm$^3$. In such an embodiment, the flow rate of the gasses through the reactor chamber 120 may be between about 10 cm$^3$/minute to about 20 cm$^3$/minute.

In accordance with methods of the present disclosure, boron nitride 122 may be provided within the reactor chamber 120 as shown in FIG. 4. The boron nitride 122 may comprise h-BN, c-BN, or any other form of boron nitride. The boron nitride 122 may comprise particles of boron nitride having a mean particle size ranging from, for example, about 70 nm to about 45 um.

Flow of fluorine gas and the one or more inert gases may be established through the reactor chamber 120 using the flow control devices 128, 130 and/or the pressure control device 132. The pressure within the reactor chamber 120 may be about five (5) pounds per square inch (psi) above or below atmospheric pressure, which is approximately 14.696 pounds per square inch.

The interior of the reactor chamber 120 may be heated to and maintained at temperatures within a range extending from about 20° C. to about 350° C. using the heating device 134.

The boron nitride 122 provided within the reactor chamber 120 may be exposed to the flowing gas and the temperature of at least 20° C. in the reactor chamber 120 for a time period of, for example, from one (1) hour to about five (5) hours. Variation in time and temperature plays a dynamic role in the process of fluorination. The proportion of the fluorine atoms in the fluorinated boron nitride depends on the temperature within the reactor chamber 120 and the time for which the boron nitride material 122 is exposed to the flowing gas within the reactor chamber 120.

In accordance with some embodiments of the present disclosure, the method of fabricating fluorinated boron nitride as described herein does not require the use of complicated procedures, toxic chemicals, or solvents. The use of additional chemicals and solvents in the methods for fluorinating boron nitride previously known in the art may lead to complex and unpredictable reaction mechanisms, as well as impurities in the fluorinated boron nitrides that are derived from processes using these additional chemicals and solvents. The method of fabricating fluorinated boron nitride as described herein does not involve any additional chemicals or solvents except boron, nitrogen, fluorine, and inert gases, which makes it a desirable option to derive inexpensive, high quality, and scalable quantities of fluorinated boron nitrides.

The method described herein may be applied to any form of boron nitride, as well as other similar materials.

Additionally, the fluorinated boron nitrides produced exhibit novel properties with various applications. The fluorination process changes the chemical functionality of the boron nitride, which leads to the addition, substitution, or embedding of the fluorine atoms into the boron nitride crystal structure. In the case of a hexagonal crystal structure, the fluorine atoms may be added, substituted, or embedded either within the 2D layers or between the 2D layers of the hexagonal boron nitride. This chemical change consequently leads to the transfer or delocalization of charges, changing the electronic structure of the boron nitride, which thus changes the electrical, optical, and magnetic properties of the material, as well.

The introduction of the electronegative fluorine atoms into the boron nitride crystal structure modifies its band gap and electronic structure, converting the electrically insulating boron nitride into a semiconductor and inducing magnetism. Because the fluorination process alters the band gap of the boron nitride material, the optical, electrical, and electronic properties of the material are thus altered. The fluorinated hexagonal boron nitride may have ferromagnetic characteristics, which may enable its use in spintronics applications. The fluorinated boron nitride may also be used in various electronics, magnetic memory, and thermal applications due to its excellent thermal conductivity.

Figure 5:
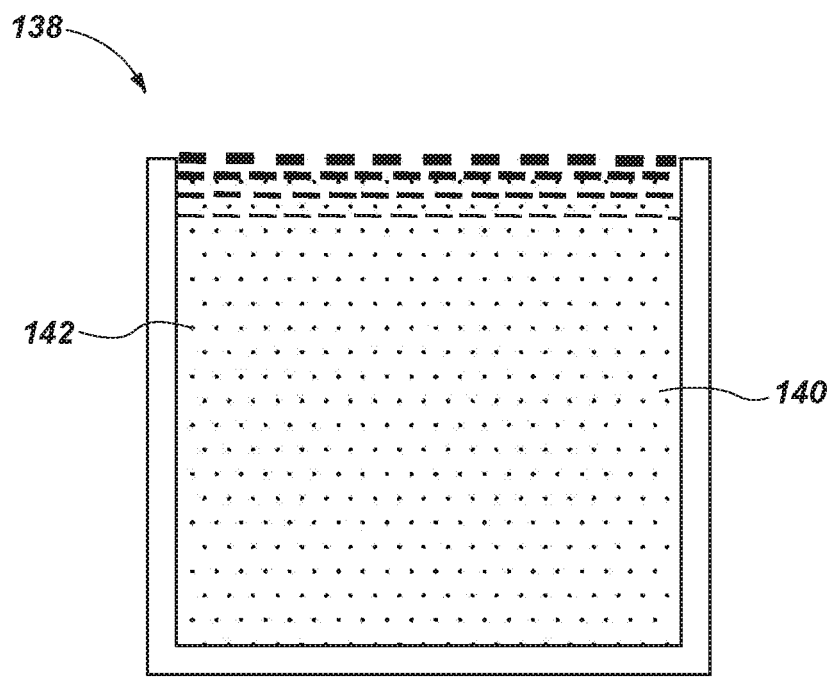
FIG. 5 illustrates an embodiment of a fluorinated boron nitride suspension according to the present disclosure.

In accordance with some embodiments of the present disclosure, a suspension 138 may comprise particles of fluorinated boron nitride 142 suspended in a fluid 140, as illustrated in FIG. 5. The fluorinated boron nitride 142 may have a hexagonal or a cubic crystal structure. In embodiments in which the fluorinated boron nitride 142 has a hexagonal crystal structure, the boron nitride 142 may be exfoliated or non-exfoliated. The fluid 140 may be polar or non-polar.

In some embodiments, the fluid 140 may comprise non-polar oil having a viscosity between about 3 $mm^2$/second and about 22 $mm^2$/second at 100° C., when tested in accordance with the Society of Automotive Engineers Standard, SAE J300 (Jan. 20, 2015 revision).

As noted above, boron nitride displays poor chemical reactivity, which makes it substantially ineffective toward common solvents. The functionalization of boron nitride with fluorine may assist in homogeneous solubilization, dispersion, and/or suspension of the boron nitride particles in various polar solvents, such as N-dimethylformamide (DMF), Tetrahydrofuran (THF), Dimethyl sulfoxide (DMSO), and alcohols etc. This leads to various applications for the fluorinated boron nitride particle.

In some embodiments, the suspension 138 of FIG. 5 may comprise a thermo-conductive fluid. Boron nitride is highly thermally conductive, with a thermal conductivity of up to about 2000 W/(mK). The fluorinated boron nitride may be used as a nanofiller to improve the thermal stability of a fluid, and may be used to increase the cooling efficiency of motor oil, for example.

In addition to motor oil, the suspension 138 may be employed in various other heat transfer applications, such as, for example, in electronics applications, as well as in nuclear cooling systems.

In some embodiments, the suspension 138 may further comprise a surfactant. The surfactant may comprise oleylamine or oleic acid. Mixing the fluorinated boron nitride materials with a surfactant may help in interfacial bonding the boron nitride with the fluid, and may reduce settling of the boron nitride particles within the fluid 140.

The following examples serve to further illustrate embodiments of the present disclosure in more detail. These examples are not to be construed as being exhaustive or exclusive as to the scope of this disclosure.

EXAMPLES

For comparative purposes, two methods of fabricating boron nitride materials were performed. The first method aimed to functionalize boron nitrides with fluorine atoms using a wet-chemical approach in accordance with previously known methods, and the second method employed a direct gas fluorination process using fluorine ($F_2$) gas as a source of fluorine in accordance with embodiments of the present disclosure. The wet-chemical approach of the first method was carried out by mixing hexagonal boron nitride powder (<1 µm, Sigma Aldrich) with N, N-dimethylformamide (DMF) and 1 mL of Nafion followed by heating in a hydrothermal reactor chamber. The hexagonal boron nitride powder comprised boron nitride particles having an average particle size of about one micron (1 µm) and purchased from Sigma-Aldrich Corporation of St. Louis, Missouri. In the first method, the hydrothermal setup was heated to 200° C. for 24 hours. The Nafion was used as the precursor for fluorine, and its amount was varied to obtain different percentages of fluorination. The high pressure within the reactor chamber caused the Nafion to breakdown into polymer fragments and also to furnish fluorine free radicals. The Nafion macromolecule breaks down into different perfluoroalkane molecules and perfluoroalkyl radicals. Hence, this method is not considered promising for direct formation of fluorinated boron nitrides.

The second method used fluorine ($F_2$) gas as the source of fluorine. This technique eliminated the need of using solvents, and is relatively inexpensive. In this method, fluorine gas was passed into a Monel flow reactor set-up as schematically illustrated in FIG. 4 and previously described herein, and the process of fluorination was carried out by varying the temperature and time intervals. This process may be used to prepare bulk quantities of functionalized boron nitrides.

X-ray Photoelectron Spectroscopy (XPS) analysis was carried out on samples of 70 nm fluorinated boron nitride particles, which were fluorinated at room temperature (RT), 50° C. and 90° C., and the results are illustrated in Table 1 below. Observation shows that all the samples exhibit fluorine content ranging between 2.5 and 8 atomic percent (at. %). Two different scenarios were observed:

First, the boron nitride powders with 70 nm average particle size indicated an increase in fluorine content as the duration of exposure to $F_2$ increased. At temperatures beyond 50° C., the atomic percent of fluorine decreased.

Second, samples with 800 nm average particle size (results not shown here) indicated the presence of higher fluorine content as the temperature and duration of their exposure to $F_2$ increased.

TABLE 1

| Sample | Boron (At. %) | Nitrogen (At. %) | Carbon (At. %) | Fluorine (At. %) |
| --- | --- | --- | --- | --- |
| (RT) 1 h-70 nm | 45.1 | 44.1 | 8.1 | 2.7 |
| (RT) 2 h-70 nm | 44.5 | 45.1 | 7.9 | 2.5 |
| (50° C.) 1 h-70 nm | 43.7 | 45.9 | 5.5 | 4.9 |
| (50° C.) 2 h-70 nm | 42.6 | 44.0 | 5.4 | 8.0 |
| (90° C.) 1 h-70 nm | 43.8 | 46.2 | 3.8 | 6.2 |
| (90° C.) 2 h-70 nm | 42.7 | 44.4 | 7.0 | 5.9 |

As shown by the XPS analysis, the particle size, temperature, and heat duration plays a significant role in controlling the content of fluorine in the fluorinated boron nitrides.

Further, the thermal stability of the fluorinated BN powders was investigated using Thermogravimetric Analysis (TGA). All samples were freeze-dried for seventy-two (72) hours before the analysis and then stored in a glovebox to avoid exposure to the atmospheric moisture. The freeze-drying reduces the amount of moisture in the samples. The predominant peak observed between 230-280° C. may be due to the cleavage of the fluorinated boron nitride. The maximum thermal stability of the F-BN framework is found to be around 300° C., beyond which the fluorinated hexagonal boron nitride decomposes to hexagonal boron nitride with the release of boron trifluoride ($BF_3$) molecules, which was detected by Evolving Gases Mass Spectrometry.

The weight loss of the 90° C.-2 h fluorinated hexagonal boron nitride sample was found to be higher (16.93%) when compared to the 50° C.-2 h (13.02%) and RT-2 h (8.36%) fluorinated boron nitride. This change in decomposition may be due to the presence of a different proportion of fluorine content and the disruption of bonds.

The presence and stability of B—F bonds was also evaluated by coupling thermogravimetric (TGA) results with Fourier transform infra-red spectroscopy (FTIR) analysis. For this study, the freeze-dried fluorinated hexagonal boron nitride sample fluorinated at 50° C. for a duration of two (2) hours was used. Before TGA, FTIR analysis was carried out on the fluorinated hexagonal boron nitride samples and it indicated the presence of B—F stretch (around 1030 $cm^{-1}$). After FTIR analysis, the samples were heat treated under an inert atmosphere using TGA to evaluate the stability of the B—F bonds. In general, the TGA analysis of the fluorinated hexagonal boron nitride samples showed two inflection points indicating weight loss, the first between 70-80° C., and the second around 200-300° C.

The sample was heated from 25-300° C. and a complete loss of peaks was observed at approximately 530 $cm^{-1}$ and 1030 $cm^{-1}$, which corresponds to the degradation of B—F bonds in the fluorinated boron nitride and formation of hexagonal boron nitride. This observation helped to evaluate the stability of the bonds formed in the derived boron nitride.

Figure 6:
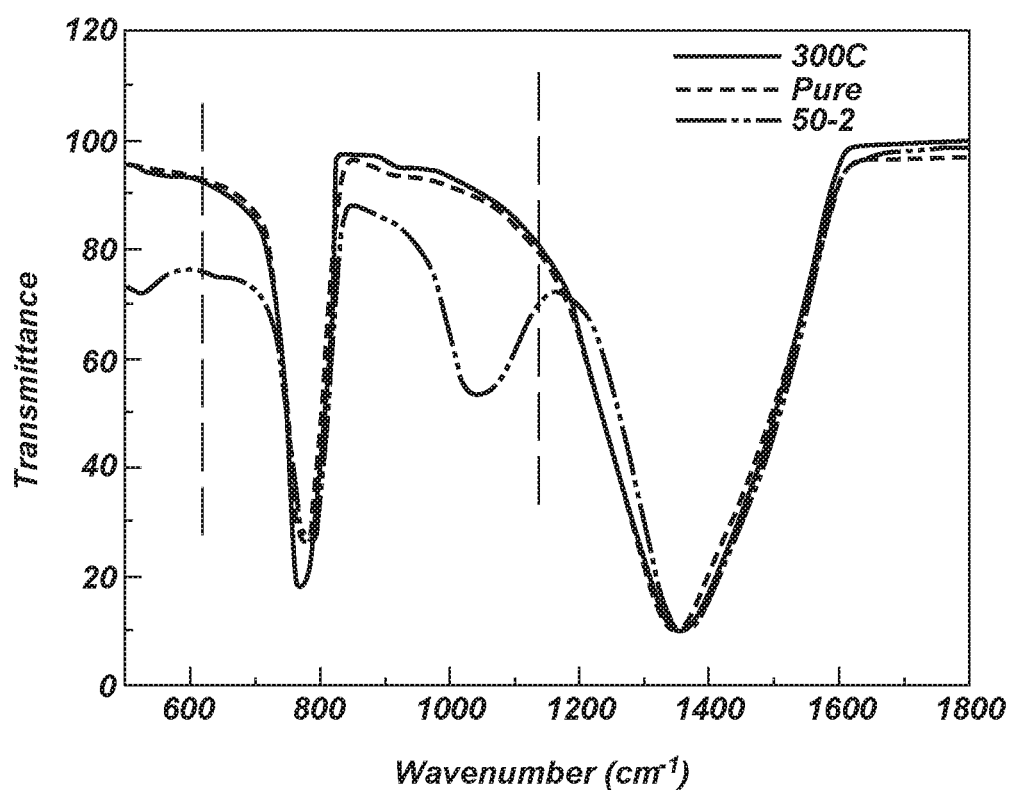
FIG. 6 illustrates a Fourier transform infra-red spectroscopy (FTIR) comparison of hexagonal boron nitrides.

For clarification purposes, the FTIR curves of pristine hexagonal boron nitride, fluorinated hexagonal boron nitride, and the post-TGA fluorinated hexagonal boron nitride sample are shown in FIG. 6. With respect to FIG. 6, pristine hexagonal boron nitride is indicated with a red line, hexagonal boron nitride fluorinated at 50° C. for a duration of two (2) hours is indicated with a blue line, and hexagonal boron nitride heated to 300° C. is indicated with a black line. The FTIR spectra clearly depict the significant changes exhibited by the fluorinated hexagonal boron nitride system. The boron exhibits stronger bonding with the fluorine atoms, forming stronger B—F bonds, while the nitrogen appears to have a weak or insignificant interaction with the nitrogen atoms, which is in line with the literature data providing the comparison of B—F and N—F bonds strength.

Figure 7:
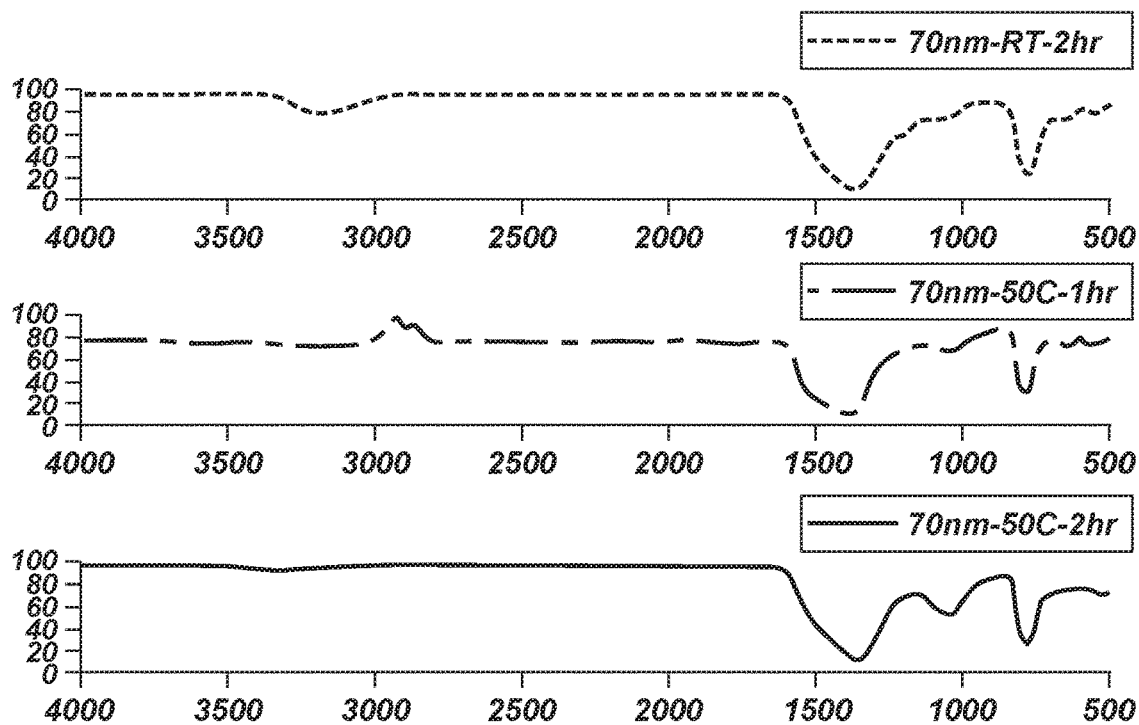
FIG. 7 illustrates an FTIR analysis of fluorinated hexagonal boron nitride before Thermogravimetric Analysis (TGA)

The FTIR analysis of the fluorinated hexagonal boron nitride samples of FIG. 7 shows a peak emerging at about 1030 $cm^{-1}$, which is due to the B—F bond. The intensity of the peak increases gradually as the duration of fluorination increases. Also, a weak signal is shown around 650 $cm^{-1}$, which may correspond to the N—F bond. This peak is not present in the samples fluorinated at temperatures higher than 50° C., which may be due to the breaking of the N—F bonds.

Similarly, the XPS analysis of the hexagonal boron nitride samples fluorinated at 50° C. for a 2 hour duration displays the presence of N (45.9 at. %); B (45.8 at. %); and F (8.2 at. %). In comparison, the atomic percentage of fluorine is reduced from 8.2 to 1.4 at. %, after heating the sample to 300° C. This may be due to the loss of B—F bonds (after the elimination of $BF_3$ gas) and weak N—F linkages. This observation correlates with the FTIR, TGA and EG-mass spectrometry data analysis. Furthermore, a decrease in transmittance peak at about 1030 $cm^{-1}$ in the FTIR was observed for the post-TGA samples, which may indicate the loss of fluorine atoms during the heating process. However, a significant difference in the transmittance was not observed for the peaks characterizing the structural units with nitrogen atoms. This is believed to demonstrate the weak interactions exhibited by the nitrogen with the fluorine atoms and strong bonding between the boron and fluorine atoms.

Nuclear magnetic resonance spectroscopy (NMR) studies of the fluorinated hexagonal boron nitride samples were also conducted. From the spectrum, several interesting peaks were identified, such as −122.2 and 123.6 ppm and another weak band around −142 ppm. Importantly, no peaks were observed around +423 ppm, which indicates the absence of trapped (physisorbed) fluorine gas in the sample.

The most significant peak, noticed around −149 ppm, is expected to be due to the functionalization of the boron nitride by fluorine. It can either be due to the presence of $BF_4^-$ anion (literature indicates a chemical shift at −151 ppm) or $NH_2F$ (literature indicates a chemical shift at −156 ppm), if boron nitride degrades and becomes functionalized.

The fluorination of hexagonal boron nitride using the direct gas fluorination technique as described herein is durable and the results show the bonding of fluorine atoms with the boron nitride. This technique is considered more advantageous to previously known methods due to the use of fewer chemicals and no solvents, thus resulting in reduced contamination. Exfoliated boron nitride sheets are expected to have a much better degree of fluorination when compared to the bulk boron nitride powders.

Oil suspensions were formed and studied using hexagonal boron nitride (h-BN) powder having an average particle size of about 1 Non-fluorinated hexagonal boron nitride powders were dispersed in isopropyl alcohol (at concentrations of about 10 mg/mL) and sonicated for five (5) hours, followed by centrifugation at 1500 rpm for thirty (30) minutes. The top solution was filtered through a millipore membrane and the membrane and filtered particles were dried overnight. The filtered particles were peeled from the membranes and dispersed in mineral oil at different weight percentages ranging from 0.1-1 weight percent (wt. %). The dispersed hexagonal boron nitride oil mixture was tested using a hand-held thermal conductivity measurement instrument. The resulting suspensions were not homogeneous and settlement of the hexagonal boron nitride in the oil was observed.

In further experiments, room temperature fluorinated boron nitride powder including particles having an average particle size of about 70 nm formed in accordance with methods according to the present disclosure were directly mixed in mineral oil at different proportions ranging from 0.1-1 wt. %. The fluorinated hexagonal boron nitride and mineral oil mixtures were sonicated for seven (7) hours and then tested for thermal conductivity at room temperature (temperature between about 20° C. and 25° C.) and at 50° C.

Figure 8:
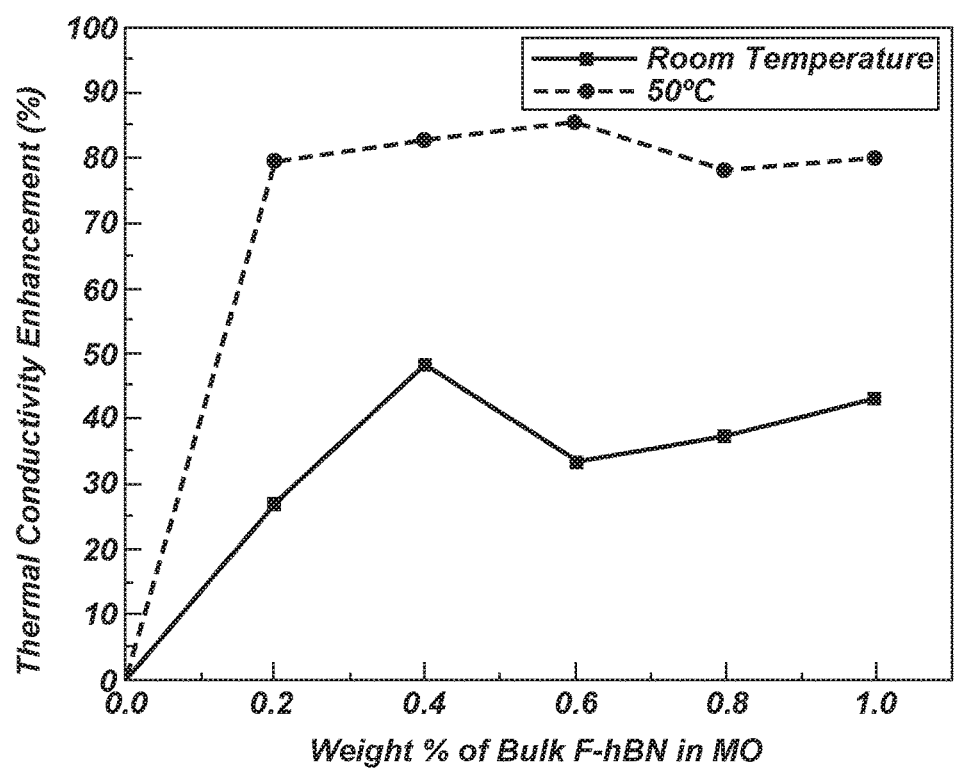
FIG. 8 illustrates thermal conductivity measurements for fluorinated hexagonal boron nitride dispersions.

FIG. 8 shows the thermal conductivity enhancement of the fluorinated hexagonal boron nitride suspensions. The fluorinated thermo-conductive suspension analyzed at room temperature (RT) is indicated with a black colored line, whereas the fluorinated thermo-conductive suspension analyzed at 50° C. is indicated with a red colored line. The RT measurement of the fluorinated, thermo-conductive nanofluids showed improvement in the thermal conductivity at up to 0.4 wt. % content of fluorinated hexagonal boron nitride, beyond which it decreased. Interestingly, a significant increase in thermal conductivity when the temperature increased to 50° C. was observed. However, the performance drops beyond 0.6 wt. % fluorinated hexagonal boron nitride content. Some settling of powders at the bottom of containers, which further reduces the thermal conductivity of the fluorinated nanofluids, was also observed.

Figure 9:
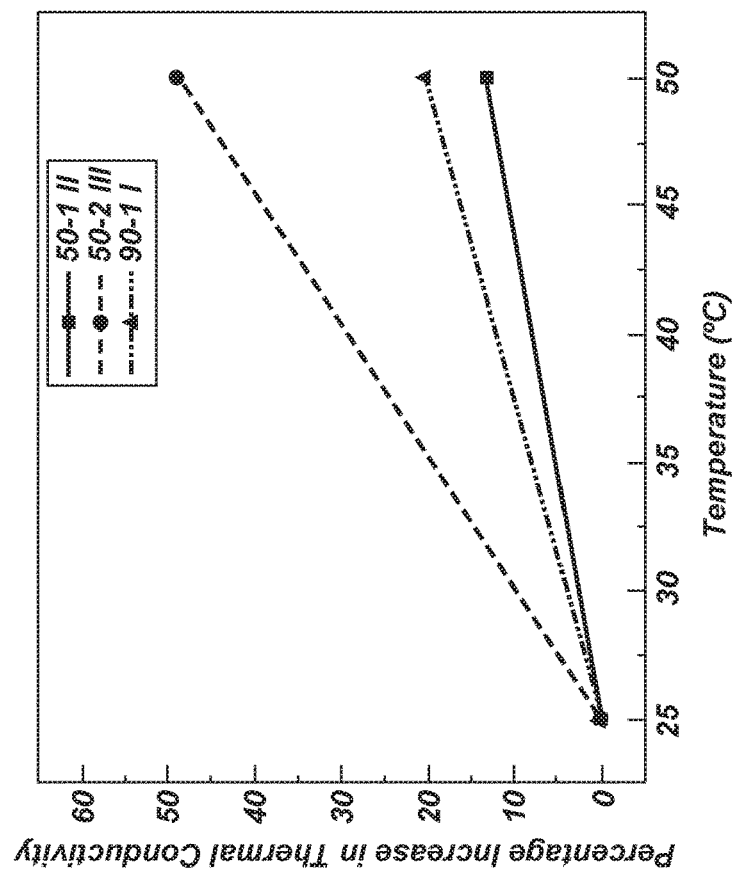
FIG. 9 illustrates the thermal conductivity enhancement with concentration for various fluorinated boron nitride samples.
Figure 9:
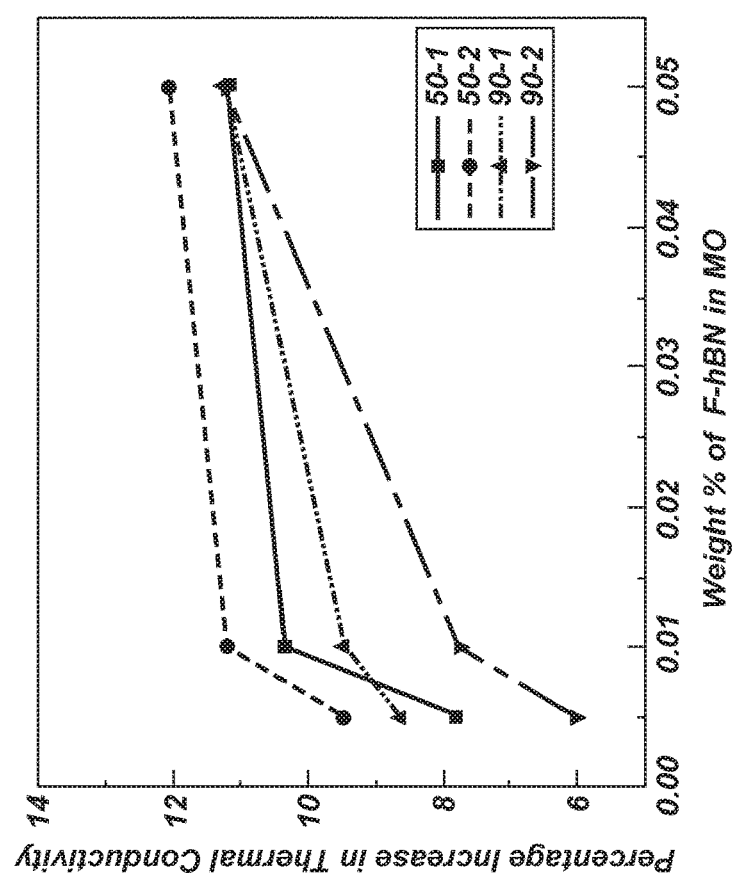

Some precipitation of the particles in the oil mixture was observed; however, no precipitation was seen in the samples with higher fluorine content. FIG. 9 shows the thermal conductivity enhancement with concentration for various samples at room temperature and with higher temperatures for 50-1 and 90-2 samples. The sample 50-1(II) corresponds to 0.01 wt. %; 50-1(III) corresponds to 0.05 wt. %; and 90-2(I) corresponds to 0.005 wt. % of fluorinated hexagonal boron nitride in mineral oil. Interestingly, the fluorinated boron nitride samples prepared at 50° C. with fluorination for a duration of 2 hours showed a significant increase in thermal conductivity when compared to other fluids. This may be due to the presence of higher fluorine (8%) content. A notable increase in the thermal conductivity with an increase in temperature can be seen in FIG. 9; specifically, the sample with 0.05 wt. % concentration (denoted as 50-1) shows a 48% increase in thermal conductivity at 50° C. when compared to the same sample measured at room temperature. From these observations, it is understood that the amount of fluorine plays a substantial role in determining the thermal conductivity of the suspensions including fluorinated hexagonal boron nitride and mineral oil.

These studies indicate that the thermal conductivity of oils can be increased using the derived fluorinated hexagonal boron nitride powders formed in accordance with the present disclosure.

Although the foregoing descriptions contain many specifics, these are not to be construed as limiting the scope of the present disclosure, but merely as providing certain exemplary embodiments. Similarly, other embodiments of the disclosure may be devised that do not depart from the scope of the present disclosure. For example, features described herein with reference to one embodiment may also be provided in others of the embodiments described herein. The scope of the embodiments of the invention is, therefore, indicated and limited only by the appended claims and their legal equivalents, rather than by the foregoing description. All additions, deletions, and modifications to the disclosure, as disclosed herein, which fall within the meaning and scope of the claims, are encompassed by the present disclosure.

What is claimed is:

1. A method for producing fluorinated boron nitride, comprising:
    heating a reactor chamber to a temperature of at least 20° C.;
    providing boron nitride within the reactor chamber;
    flowing a gas through the reactor chamber, the gas comprising fluorine and an inert gas, wherein fluorine comprises not more than 50% of the gas; and
    exposing the boron nitride to the flowing gas at the temperature of at least 20° C. in the reactor chamber.

2. The method of claim 1, wherein further comprising selecting the boron nitride to comprise boron nitride powder, the boron nitride powder including particles having an average particle size in a range extending from 70 nanometers to 45 micrometers.

3. The method of claim 1, wherein further comprising exposing the boron nitride to the flowing gas at the temperature of at least 20° C. in the reactor chamber for at least 1 hour.

4. The method of claim 1, further comprising selecting the inert gas from among helium and nitrogen.

5. The method of claim 1, wherein the boron nitride comprises two-dimensional atomic layers of boron nitride.

6. The method of claim 5, further comprising exfoliating the two-dimensional atomic layers of boron nitride from particles of hexagonal boron nitride.

7. The method of claim 6, further comprising exfoliating the two-dimensional atomic layers of boron nitride from particles of hexagonal boron nitride before providing the boron nitride within the reactor chamber.

8. The method of claim 6, further comprising exfoliating the two-dimensional atomic layers of boron nitride from particles of hexagonal boron nitride within the reactor chamber.

9. The method of claim 1, further comprising forming fluorinated boron nitride comprising a hexagonal crystal structure by fluorinating the boron nitride within the reactor chamber.

10. The method of claim 1, further comprising forming fluorinated boron nitride comprising a cubic crystal structure by fluorinating the boron nitride within the reactor chamber.

11. The method of claim 1, further comprising:
    removing the fluorinated boron nitride from the reactor chamber; and
    mixing the fluorinated boron nitride with a surfactant.

* * * * *

UNITED STATES PATENT AND TRADEMARK OFFICE
CERTIFICATE OF CORRECTION

PATENT NO. : 11,897,767 B2  
APPLICATION NO. : 16/721552  
DATED : February 13, 2024  
INVENTOR(S) : Valery N. Khabashesku, Ashok Kumar Meiyazhagan and Pulickel M. Ajayan Page 1 of 1

It is certified that error appears in the above-identified patent and that said Letters Patent is hereby corrected as shown below:

In the Specification

Column 8, Line 42, change "about 1 Non-fluorinated" to --about 1 µm. Non-fluorinated--

Signed and Sealed this  
Twenty-first Day of January, 2025

Coke Morgan Stewart  
*Acting Director of the United States Patent and Trademark Office*